United States Patent
Zhu (10) Patent No.: US 6,826,305 B2
(45) Date of Patent: Nov. 30, 2004

(54) METHODS AND APPARATUS FOR LOCATING AND IDENTIFYING TEXT LABELS IN DIGITAL IMAGES

(75) Inventor: Jie Zhu, Westminster, CO (US)

(73) Assignee: NCR Corporation, Dayton, OH (US)

( * ) Notice: Subject to any disclaimer, the term of this patent is extended or adjusted under 35 U.S.C. 154(b) by 520 days.

(21) Appl. No.: 09/818,379

(22) Filed: Mar. 27, 2001

(65) Prior Publication Data

US 2002/0141641 A1 Oct. 3, 2002

(51) Int. Cl.[7] ............................ G06K 9/00; G06K 9/68
(52) U.S. Cl. ....................... 382/172; 382/170; 382/218
(58) Field of Search ................................ 382/101, 102, 382/159, 168, 170, 171, 172, 173–174, 189, 176, 218, 305, 321; 707/500, 530, 517, 518, 519, 520, 521

(56) References Cited

U.S. PATENT DOCUMENTS

| | | | | |
|---|---|---|---|---|
| 5,850,476 A | * | 12/1998 | Chen et al. | 382/177 |
| 5,892,842 A | * | 4/1999 | Bloomberg | 382/173 |
| 5,892,843 A | * | 4/1999 | Zhou et al. | 382/176 |
| 5,956,419 A | * | 9/1999 | Kopec et al. | 382/159 |
| 6,298,173 B1 | * | 10/2001 | Lopresti | 382/305 |
| 6,683,967 B1 | * | 1/2004 | Takahashi | 382/101 |

* cited by examiner

Primary Examiner—Andrew W. Johns
Assistant Examiner—Amir Alavi
(74) Attorney, Agent, or Firm—Priest & Goldstein, PLLC; Paul W. Martin

(57) ABSTRACT

Techniques for identifying labels appearing in images are described. A digital image is analyzed to identify individual components. Each of the individual components is analyzed to determine whether or not it is a text component by comparing it against criteria such as size, aspect ratio, and proximity to other components. Each component identified as a text component is compared against criteria such as size in order to identify it as a label or not. Location coordinates of each label are stored in association with the label and optical character recognition is performed on the labels. Once the labels are identified, each image can be used as an online catalog page. For example, an image may be used to construct a web page containing pictures of available products with each label serving as a hypertext link to retrieve further information about the product or to enter an order for the product. Automatically identifying labels simplifies the conversion of preexisting paper catalog pages to online catalog pages or similar digitized images.

14 Claims, 6 Drawing Sheets

PRODUCTION COMPRESSOR REQUIRES PRODUCTION ELECTRICAL COMPONENTS.
SERVICE COMPRESSOR REQUIRES PRODUCTION ELECTRICAL COMPONENTS.
FOR FURTHER INFORMATION, REFER TO STANDARD BRAND AND RELATED COMPONENTS.

FIG. 7

METHODS AND APPARATUS FOR LOCATING AND IDENTIFYING TEXT LABELS IN DIGITAL IMAGES

FIELD OF THE INVENTION

The present invention relates generally to text identification. More particularly, the invention relates to improved methods and apparatus for locating and recognizing text labels appearing in digital images.

BACKGROUND OF THE INVENTION

Many retailers employ catalogs to provide information about their products. A typical catalog, such as one used by an auto parts retailer, comprises numerous pages, each page having a schematic or diagram with images of several products. Each image of a product is adjacent to a label which serves as an index pointing the shopper to a detailed description of the product including whatever information the retailer wishes to include, such as part number, description, function, shelf location or price. The customer's attention is drawn to the desired item by the image, and the label allows the customer to easily locate additional useful information.

As electronic data storage and processing has become more widely used in retailing, more retailers are storing catalogs electronically so that customers can obtain access to catalogs via the World Wide Web or via kiosks located in a retail store. However, a digitized image of a page from a paper catalog does not provide the customer with an immediate way to retrieve the indexed information. The customer must type the label or use some other means of data entry, and this is not as convenient as simply pointing to the label in order to retrieve the index. It would be advantageous if the catalog labels could be implemented as hot buttons or hypertext links so that the customer could simply click on a hot button or link in order to retrieve information associated with the hot button or link.

In many cases it is difficult to rewrite catalog pages to include hotkeys or links because of the magnitude of the task. Many retailers have thousands of already existing catalog pages. Auto parts retailers in particular have large numbers of pages which do not need to be changed because the pages refer to replacement auto parts used in older model cars, and each of these cars is able to use the same replacement parts so long as the cars exist and the parts continue to be available. If a 1965 Ford Mustang, for example, requires a new radiator hose, that hose will need to have the same specifications whether it is purchased in 1995, 2000 or 2005. The description of such a hose appearing on a catalog page will therefore not need to change. Auto parts retailers, therefore, along with many other retailers, have a large base of catalog pages which do not need to be updated in the ordinary course of business. It would therefore represent a significant extra expense to review these thousands of pages to add hotkeys or links, if this had to be done manually. It is possible to use optical character recognition (OCR) on labels in order to convert them to text, but typical catalog pages contain a mixture of pictures and text, so that simply attempting to perform OCR on an entire page would waste processing capacity due to the attempt to perform OCR on non text components. Moreover, not all text on a catalog page is necessarily a label. Performing OCR on text which is not a label wastes processing time, and assuming that any text on a page is a label results in improper designation of text as labels, requiring that the improper designation be found and corrected.

There exists, therefore, a need in the art for a system for analyzing graphic images of catalog pages to identify labels for designation as hotkeys or links, which can distinguish between text and non text components and which can further distinguish between text components which are labels and text components which are not labels.

SUMMARY OF THE INVENTION

A system according to the present invention receives graphic images produced by scanning of catalog pages. The system analyzes each image using connected component analysis in order to identify each component which should be considered as a unit, such as drawings, lines of text and the like. Each component is a collection of connected foreground pixels. Foreground pixels are typically black, or another color darker than the background. Once all the components in the image are identified, each component is analyzed to determine if it is a text or a non-text component. Text components are identified by their size, aspect ratio, density and other features. Once text components are identified, each text component is examined in order to determine if it is the right length for a label. Labels tend to be relatively short, typically consisting of one, two or three digits. Text components which are significantly longer than this length are unlikely to be labels and are removed from consideration. After all non-label text components are removed from consideration and all labels identified, the location of each label is determined and optical character recognition is performed on the labels.

A more complete understanding of the present invention, as well as further features and advantages of the invention, will be apparent from the following Detailed Description and the accompanying drawings.

DETAILED DESCRIPTION

Figure 1:
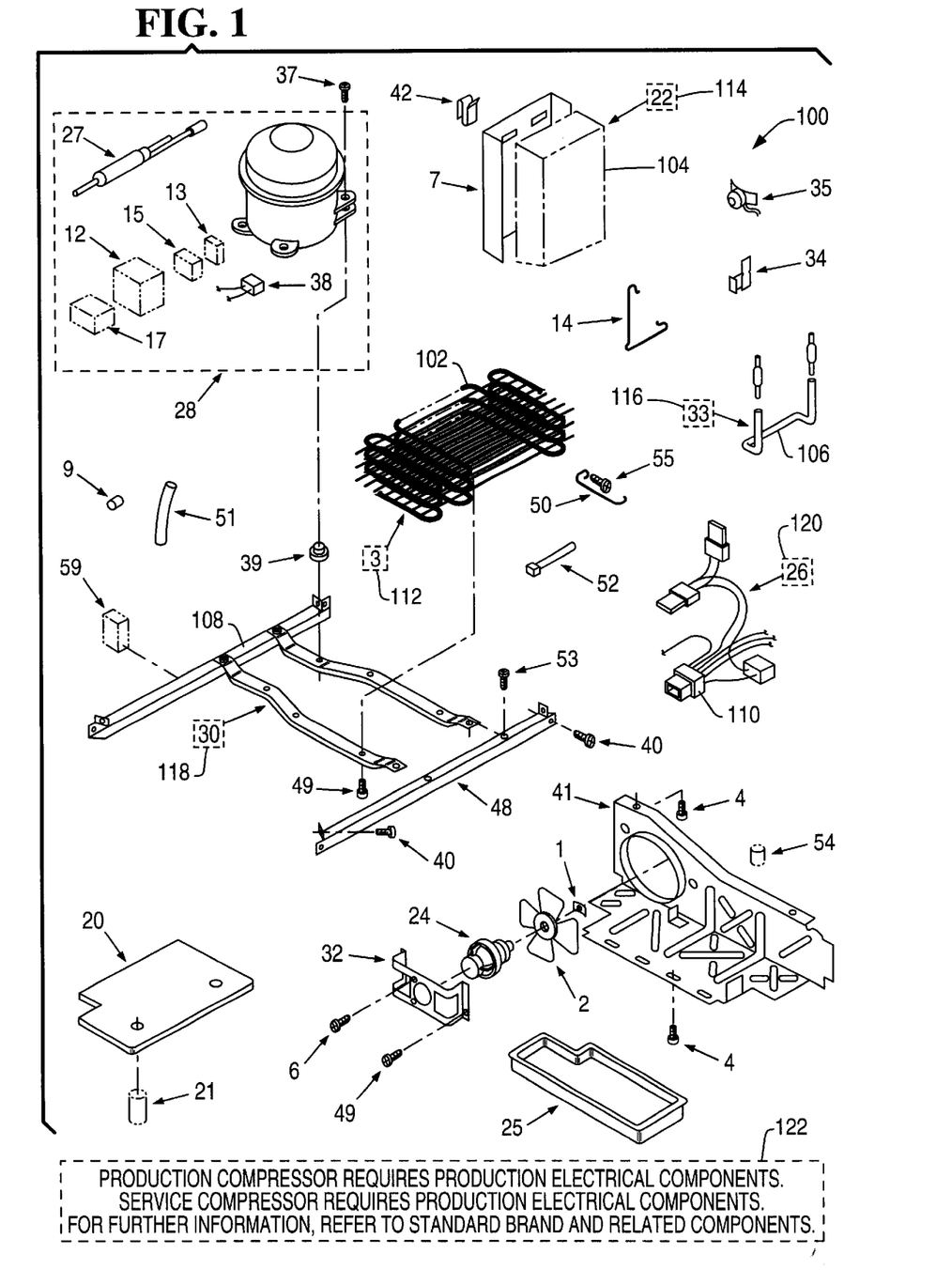
FIG. 1 illustrates a graphic image suitable for processing according to the present invention.

FIG. 1 illustrates a graphical image 100 suitable for processing according to the present invention. The image 100 includes numerous graphical elements of which the elements 102–110 are representative. The image 100 also includes a label for each graphical element, with the labels 112–120 corresponding to the elements 102–110. The image 100 also includes a text element 122 which is not a label, but instead represents a explanatory information concerning the depicted items. The labels have numerous differences from the graphical elements as well as similarities among themselves. The similarities among labels and the differences from graphical elements lend themselves to several techniques for identifying labels. It can be noted that the labels are similar in general shape, with the labels all having certain characteristics falling within a particular range. Examples of such characteristics are height and aspect ratio. The graphical elements, on the other hand, vary widely in shape and do not all fall within any particular range of heights or aspect ratios, unless the ranges were chosen to be so wide as to be useless. Furthermore, the labels all fall within a relatively narrow size range, and are relatively small. The non-label text element 122 is not within the size range of the labels, being much larger than the labels. The graphical elements come in all different sizes. Once each particular element of the image 100 can be identified, then, the image can be searched for elements having height, aspect ratios and other suitable characteristics which fall within an appropriate range and are within a particular range of sizes. These features will serve to distinguish text labels from graphical elements.

The ranges used to separate the text labels from other components, and the thresholds used to identify the lower and upper bounds of ranges may suitably be predetermined constants. Alternatively, the ranges and thresholds may be determined dynamically based on individual images. Dynamically determining the ranges and thresholds is useful in cases in which the characteristics of text labels vary significantly from page to page. Text on the same page is generally printed with the same fonts, and pages on which labels are to be identified typically have a significant number of labels. The labels on a page will therefore typically have similar characteristics. Other images, such as photographs or drawings, will have varying characteristics. The values of selected characteristics of labels, such as height or aspect ratio, may be identified by examining the distribution of the values of these characteristics as they occur on all components on a page and plotting a histogram of these parameters. The ranges and thresholds for values which are typical of labels can then be determined from the dominant peaks of the histograms.

Figure 2:
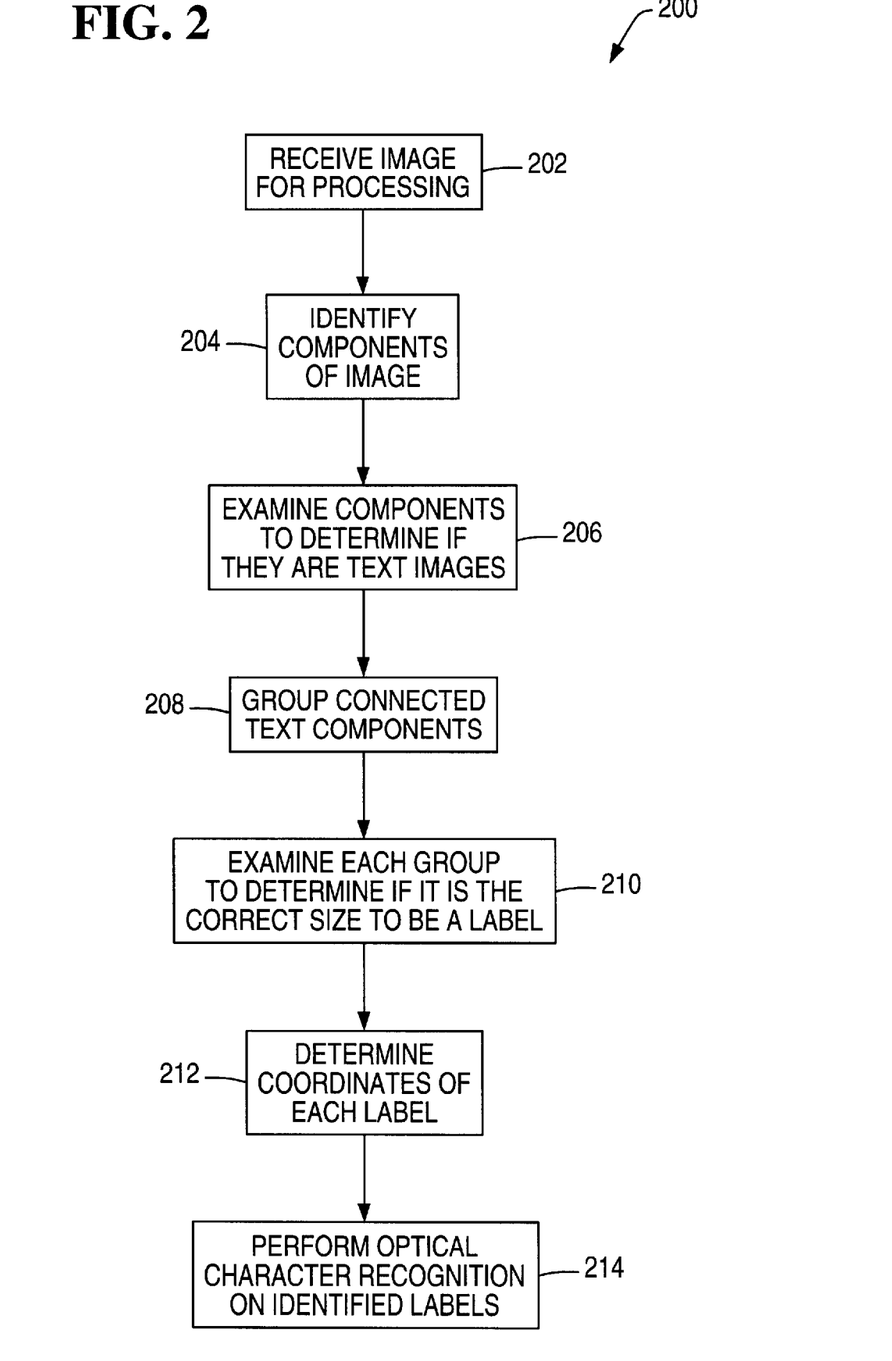
FIG. 2 illustrates a process of text label identification according to the present invention.

FIG. 2 illustrates a process of text label identification 200 according to the present invention. At step 202, a digitized graphic image is received for processing. A typical image received for processing by the process 200 comprises graphic items such as photographs, sketches, diagrams and the like, with one or more of the graphic items accompanied by a text label. The text labels are typically combinations of characters such as numerals and letters and are typically relatively short, usually consisting of no more than two or three characters. At step 204, individual components of the image are identified. An individual component is a component which is complete by itself, rather than a part of another component. Examples of individual components include graphical images, strings of text and the like. At step 206, each individual component is examined to determine whether it is a text component or not. Components are identified as text according to how well they meet specified criteria, with components which fail to meet the criteria being removed from consideration and the remaining components being identified as text. At step 208, connected text components are grouped. Neighboring text components are grouped horizontally, if the spacing between them meets certain requirements. The presently preferred rules for grouping are that the distance between components in a group must not exceed the length of either component and the spaces between three or more components must be approximately equal. At step 210, each grouping of text components is examined to determine if it is the correct size to be a label. Labels typically consist of no more than two or three characters, therefore any text element which is longer than a predetermined size is determined not to be a label. Text components which fall within the predetermined size range are identified as labels. At step 212, the location coordinates of each label are noted and the location coordinates of each label are stored in association with the label. At step 214, optical character recognition is performed on the text components which have been identified as labels.

Figure 3:
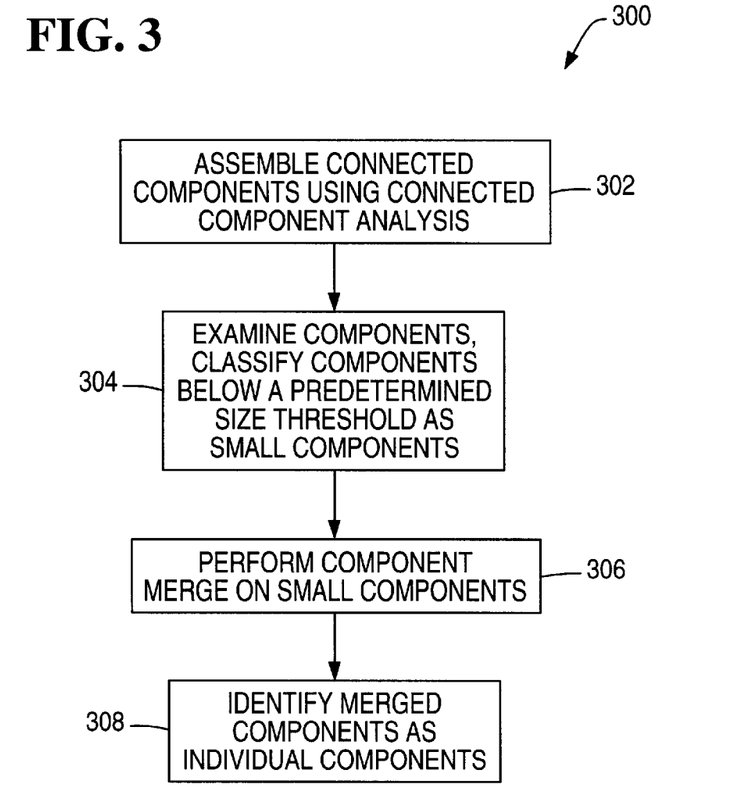
FIG. 3 illustrates a process of individual component analysis according to the present invention.

FIG. 3 illustrates details of a process of individual component identification 300 according to the present invention. The process 300 may suitably be employed as the step 204 of FIG. 200. At step 302, connected component analysis is performed on the image to assemble connected components, which are groups of touching pixels. At step 304, connected components are examined and the size of each component is compared against a predetermined threshold. If the size of a component is below the predetermined threshold, the component is classified as a small component. At step 306, a component merge is performed on each small component. The small components and their neighbors are examined. If a component is close enough to its neighbor based on their sizes, it is merged with its neighbor. This operation is performed recursively until all small components are tested and no more meet the requirement for merging. At step 308, the components are identified as individual components.

Figure 4:
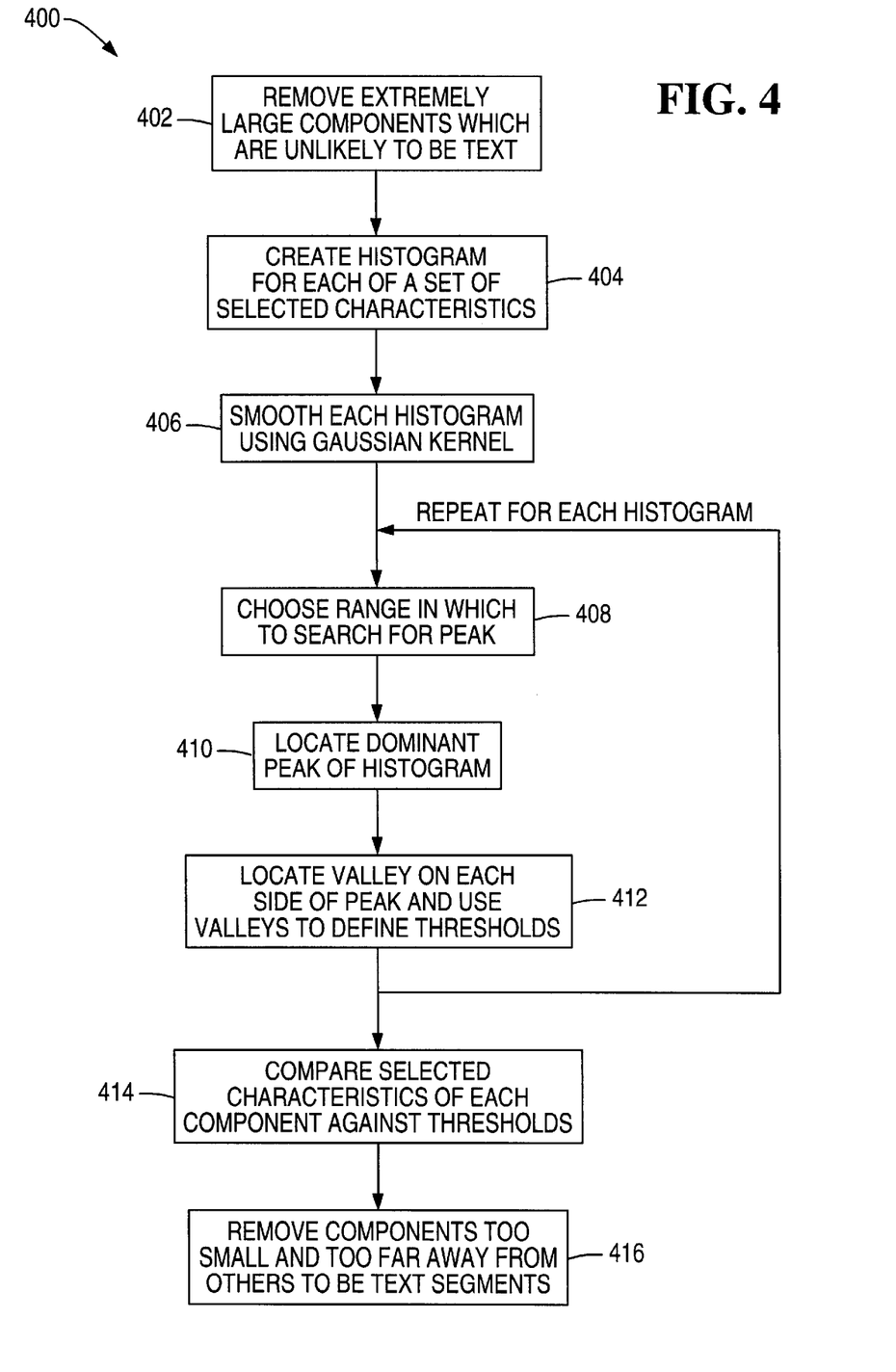
FIG. 4 illustrates a process of text identification according to the present invention.

FIG. 4 illustrates a process of text identification 400 according to the present invention, which may suitably be implemented as the step 206 of FIG. 2. The process of text identification 400 removes connected components which are unlikely to be text components. At step 402, extremely large components that are not likely to be text are removed. At step 404, a histogram is created for each of a set of selected characteristics which are to be used to distinguish text components from non-text components, such as width, height, aspect ratio, (the ratio of component height to component width) area, centroid, pixel count or other suitable characteristics. At step 406, each of the histograms is smoothed using a Gaussian kernel. Next, each of the histograms is analyzed to define ranges in which values characteristic of text labels will appear. The dominant peak in each histogram can be expected to reflect a value characteristic of text labels. This is true because occurrences of text on the same page, and especially text labels, are similar to one another, while characteristics of other components such as photographs and drawings will differ significantly. For this reason, the most frequently occurring value of a selected characteristic can be attributed to multiple occurrences of the value in text including text labels. At step 408, the analysis of histogram proceeds by choosing a realistic range in order to search for a peak. For example, in most instances text font sizes will fall within a range of 8 to 16, causing height, aspect ratios and other characteristics to fall within a particular range. If text font sizes are used which do not fall within the range of 8 to 16 or which fall within a narrower range, suitable adjustments can be made in defining the search range. Next, at step 410, the dominant peak of the histogram is located. At step 412, the valleys on each side of the peak are located and lower and upper thresholds for the characteristic indicated by the histogram are identified at appropriate points within the valleys. The lower and upper thresholds define the range used to identify a text label. Components which have a value falling outside the range will be excluded from consideration.

Steps 408 through 412 are repeated for each histogram in order to define upper and lower thresholds for each characteristic to be considered. At step 414, the selected characteristics of each component are compared to the acceptable ranges for each characteristic and components whose characteristics do not fall within the ranges are removed. At step 416, components that are too small and too far away from other components to be text components are removed. These small components could result from noise, or dark segments of a textured background. The remaining components are identified as text components.

As an alternative to performing the steps 404–412 in order to identify ranges in which characteristics of text labels are likely to fall, it is also possible to predefine acceptable ranges. This approach is suitable for cases in which the characteristics of text labels are already known for the components under consideration, such as instances in which numerous catalog pages all have text of the same size and with similar characteristics, and simplifies processing in those instances in which it is appropriate.

Figure 5:
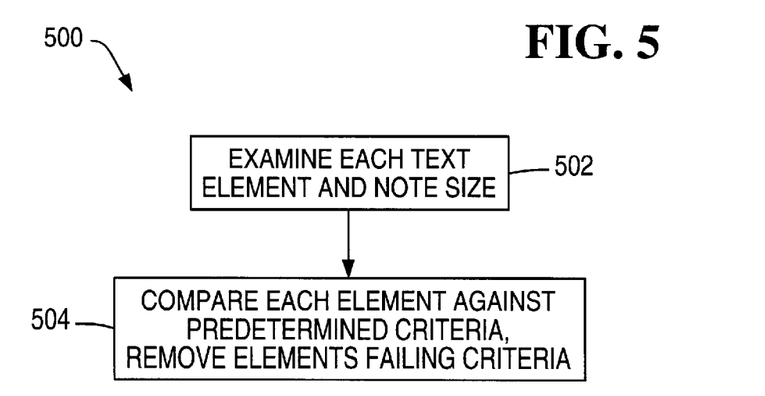
FIG. 5 illustrates a process of label identification according to the present invention.

FIG. 5 illustrates a process of label identification 500 according to the present invention. The process 500 is preferably employed as the step 208 of the process 200 of FIG. 2. At step 502, each text element is examined and its size noted. At step 504, the size of each text element is compared against predetermined criteria and elements which do not meet the criteria are removed from consideration. Labels typically consist of no more than two or three characters, so that a criterion can easily be selected which identifies a text element which is unlikely to be a label because its size is too great.

Figure 6:
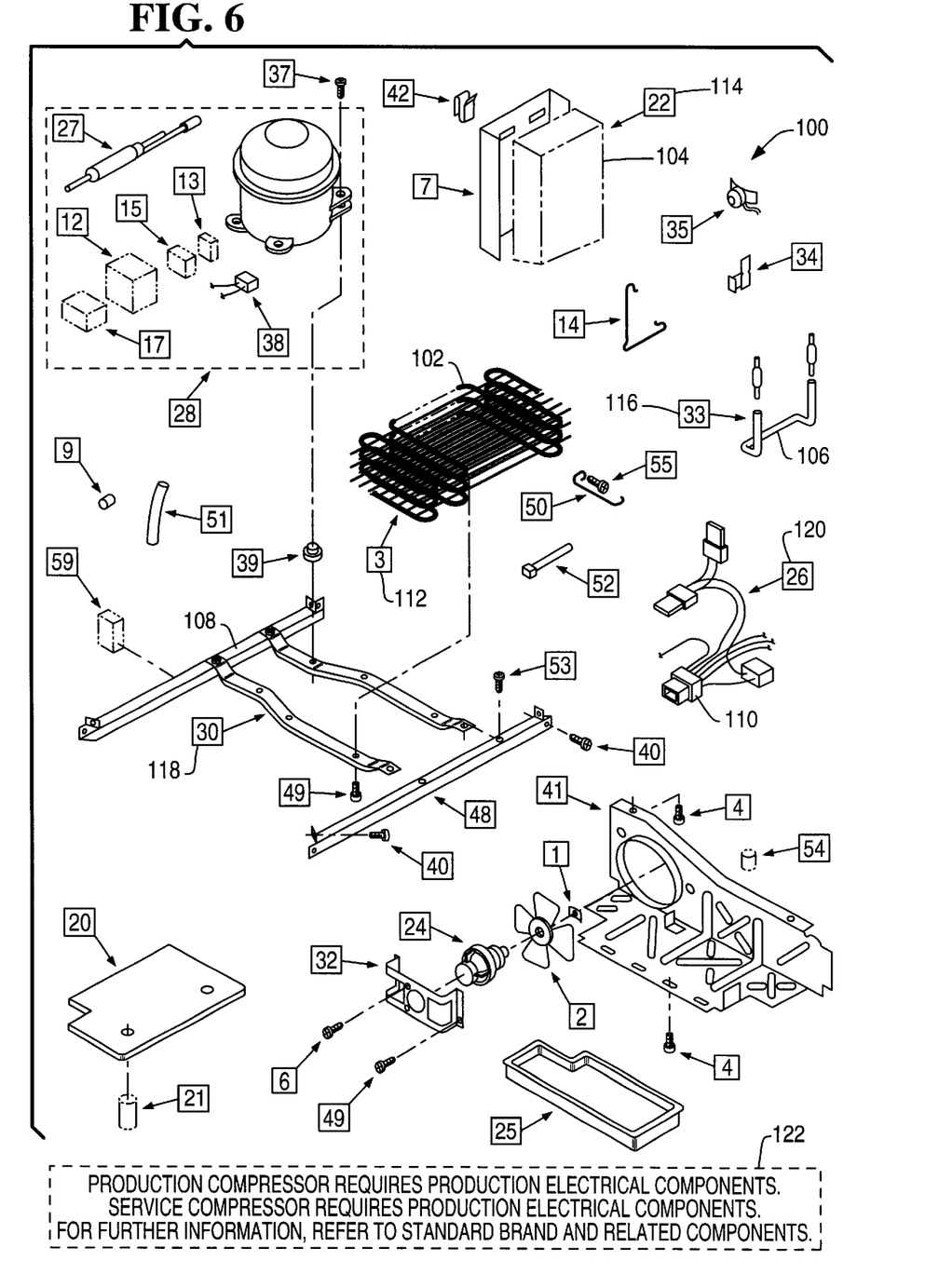
FIG. 6 illustrates a catalog page with labels identified employing the teachings of the present invention.

FIG. 6 illustrates the graphical image 100 after the text labels have been identified using the techniques of the present invention, such as the processes 200–500 of FIGS. 2–5. The labels 112–120 belonging to the graphic elements 102–110 can here be seen to have been successfully identified and marked. The non-label text element 122, comprising explanatory material, has not been identified as a label because it does not meet the size criteria for labels.

Figure 7:
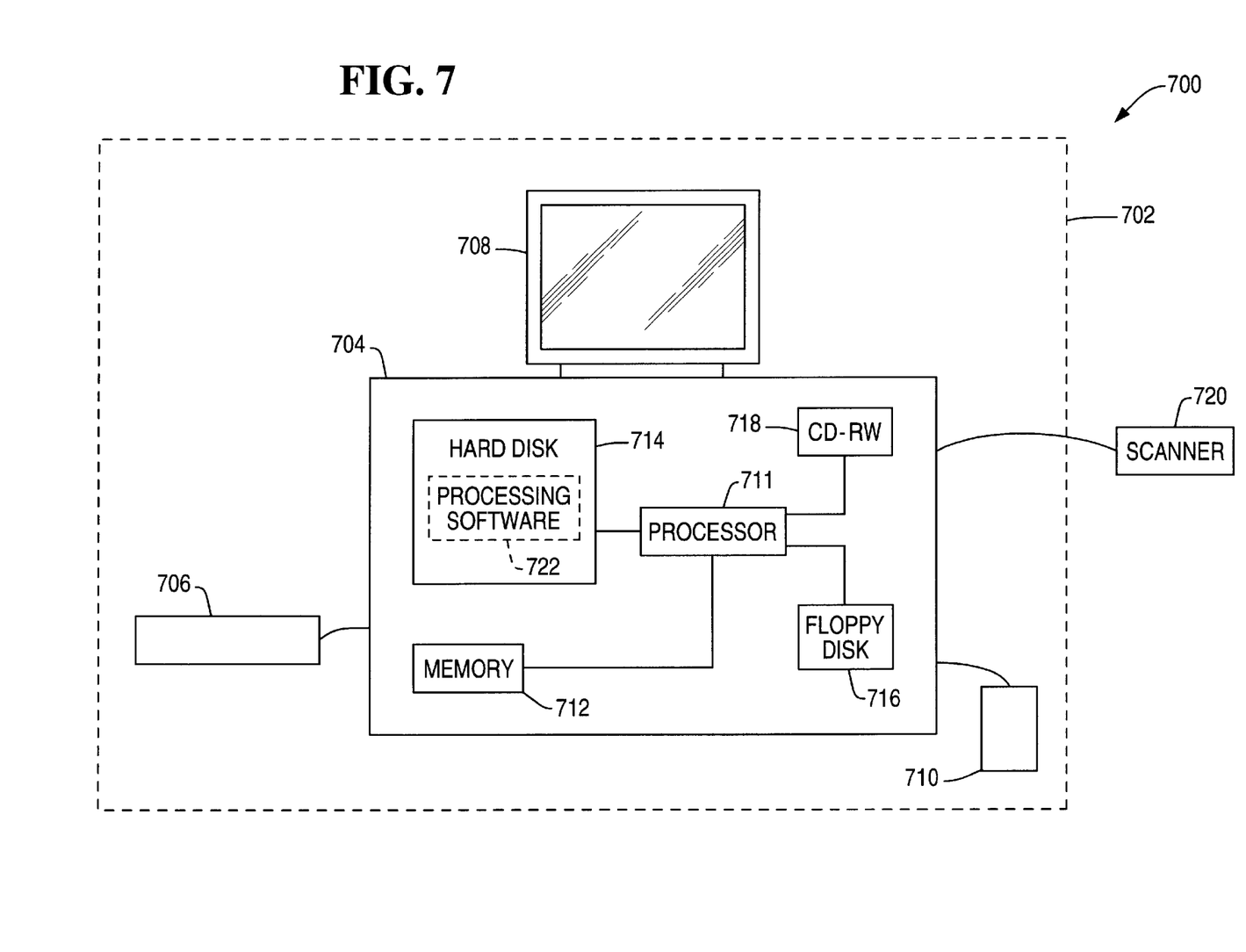
FIG. 7 illustrates a label identification and processing system according to the present invention.

FIG. 7 illustrates a label identification and processing system 700 according to the present invention. The system 700 includes a computer 702 including a CPU unit 704, keyboard 706, monitor 708 and a pointing device such as a mouse 710. The CPU unit 704 preferably contains a processor 711, memory 712, a hard disk 714, a floppy disc drive 716 and a recordable rewritable compact disk (CD-RW) drive 718. A scanner 720 is connected to the computer 702 in order to allow scanning of images for processing. The computer 702 includes stored software implementing the processes 200–500 of FIGS. 2–5. In order to perform label identification using the system 700, a user scans one or more catalog pages using the scanner 720 to create a set of scanned images, one scanned image representing an individual catalog page. Alternatively, previously stored images can be copied using the floppy disk drive 716 or CD-RW drive 718. The computer 702 processes each image to identify and mark text labels on each image and to perform optical character recognition on the labels, and associates a set of coordinates with each label. The computer stores each label-identified image. The computer 702 then further processes each label-identified image to substitute a hot button or hypertext link for the identified label. The processed label-identified images can then be converted to web pages or other similar images which allow selection of hot buttons or links by a user. Whenever a label-identified image is changed in size or proportions or otherwise altered, the coordinates of each label are translated to correspond to the new location of the label and the new coordinates are stored along with the image. The web pages or similar images can be assembled into an online catalog allowing a customer to search or browse for items and to select an item by clicking on or otherwise activating its associated hot button or link.

While the present invention is disclosed in the context of a presently preferred embodiment, it will be recognized that a wide variety of implementations may be employed by persons of ordinary skill in the art consistent with the above discussion and the claims which follow below.

I claim:

1. A method of text label identification comprising the steps of:
   identifying individual components of a digital image;
   examining each component to determine whether or not the component is a text component and identifying each text component, including the substeps of
   excluding very large components from consideration;
   examining selected characteristics of each component remaining under consideration to determine whether they fall within limits established for the characteristics and excluding components for which the selected characteristics fall outside of the limits;
   excluding components which are too small and too far away from other components to be text; and
   designating the remaining components as text;
   wherein establishing the limits for each characteristic includes the substeps of
   creating a histogram for the characteristic;
   identifying a dominant peak of the histogram;
   locating a lower limit at a valley below the dominant peak; and
   locating an upper limit at a valley above the dominant peak;
   performing connected component analysis on each text component to produce grouped text components; and
   comparing each grouped text component against predetermined criteria to determine whether the grouped text component is a label and identifying each grouped text component meeting the criteria as a label.

2. The method of claim 1 further comprising a step of noting location coordinates of each label and storing the location coordinates in association with the label.

3. The method of claim 2 further comprising performing optical character recognition on each label.

4. The method of claim 3 wherein the predetermined criteria against which each grouped text component is compared includes size criteria to determine if the grouped text component is the correct size to be a label.

5. The method of claim 4 wherein the step of identifying the individual components of the image comprises:
   performing connected component analysis on each component;
   comparing each component against a size criterion to identify whether or not a component is a small component;
   performing a merge on all small components to merge each group of small components meeting specified criteria into a merged components; and
   identifying each individual and merged component as an individual component.

6. The method of claim 1 wherein the step of creating the histogram is followed by a step of smoothing the histogram using a Gaussian kernel.

7. The method of claim 6 wherein the step of smoothing the histogram is followed by a step of choosing a realistic range in which to search for the dominant peak.

8. The method of claim 7 wherein the step of examining each grouped text component comprises comparing the component against predetermined size criteria and designating as a label each component meeting the size criteria.

9. The method of claim 1 wherein the limits are predetermined constants.

10. A label identification system comprising:

digital storage for storing digital images;

a processor for processing each of the images to identify labels appearing on each image, the processor being operative to identify each individual component of the image, to identify each of the individual components as a text component or a non text component by excluding very large components from consideration;

examining selected characteristics of each component remaining under consideration to determine whether they fall within limits established for the characteristics and excluding components for which the selected characteristics fall outside of the limits;

excluding components which are too small and too far away from other components to be text; and designating the remaining components as text;

wherein the processor establishes the limits for each characteristic by creating a histogram for the characteristic;

identifying a dominant peak of the histogram;

locating a lower limit at a valley below the dominant peak; and locating an upper limit at a valley above the dominant peak; and wherein the processor further identifies each text component as a label or a non-label.

11. The label identification system of claim 10 further comprising a scanner to capture images for storage as digital images.

12. The label identification system of claim 11 wherein the processor is further operative to store location coordinates for each label in association with the label.

13. The label identification system of claim 12 wherein the processor is further operative to perform optical character recognition on each label.

14. A method of text label identification comprising the steps of:

identifying individual components of a digital image, including the substeps of performing connected component analysis on each component;

comparing each component against a size criterion to identity whether or not a component is a small component;

performing a merge on all small components to merge each group of small components meeting specified criteria into a merged components; and identifying each individual and merged component as an individual component;

examining each component to determine whether or not the component is a text component and identifying each text component, including the substeps of excluding very large components from consideration;

examining selected characteristics of each component remaining under consideration to determine whether they fall within limits established for the characteristics and excluding components for which the selected characteristics fall outside of the limits;

excluding components which are too small and too far away from other components to be text; and designating the remaining components as text;

wherein establishing the limits for each characteristic includes the substeps of creating a histogram for the characteristic;

identifying a dominant peak of the histogram;

locating a lower limit at a valley below the dominant peak; and locating an upper limit at a valley above the dominant peak;

performing connected component analysis on each text component to produce grouped text components;

comparing each grouped text component against predetermined criteria to determine whether the grouped text component is a label and identifying each grouped text component meeting the criteria as a label;

wherein the predetermined criteria against which each grouped text component is compared includes size criteria to determine if the grouped text component is the correct size to be a label;

noting location coordinates of each label and storing the location coordinates in association with the label; and performing optical character recognition on each label.

* * * * *